Patented Dec. 28, 1943

2,337,908

UNITED STATES PATENT OFFICE 2,337,908

GUTTA-PERCHA-LIKE COMPOSITIONS

Gerry P. Mack, Jackson Heights, N. Y., assignor to Advance Solvents & Chemical Corporation, New York, N. Y., a corporation of New York No Drawing. Application August 9, 1941,
Serial No. 406,186

7 Claims. (Cl. 260—4)

The present invention pertains to compositions of matter having physical properties resembling natural gutta percha and serving as substitutes for said natural product.

Gutta percha, as is known, is employed in many ways, such as coatings on paper, cloth, metal foils and the like, in numerous arts, such as in moisture-proofing, electrical insulation, adhesives, thermoplastics, thermoplastic coatings, and the like. One of the chief disadvantages of gutta percha, when used in these various relationships, is its tendency to lose its original physical and chemical properties due to oxidation.

I have now provided compositions which very closely resemble gutta percha in its physical properties, but which are superior to the natural gutta percha, in that they are resistant to oxidation and, therefore, do not deteriorate, as does the natural product in the course of time. Such compositions and products derived therefrom constitute the purposes and objects of the present invention.

The compositions herein contemplated as substitutes for natural gutta percha contain a polymerized iso olefine, a condensed or cyclicized rubber derivative, a wax and a terpene polymer resin originating from turpentine or a hydrogenated derivative of such resin. The polymerized iso olefine is a substantially saturated linear polymer of high molecular weight, such as of polyisobutylene, polyisopentene and the like. The polymer should have a molecular weight above 1500, say, from 5000 to as high as 200,000 as determined by the Staudinger method. This component is one of the most essential elements of the composition in that it is through the modification of this component by the other components mentioned that the properties possessed by the compositions are in the main attributable.

The condensed or cyclicized rubber derivative is a product obtained by subjecting rubber to the action of condensing agents, such as halides of amphoteric metals, i. e. tin tetra chloride, ferric chloride, stannic chloride, stannic bromide, and the like, halogenated acids of tin, i. e. chlorostannic acid, chlorostannous acid, the corresponding brom-acids and the like, boron halides, i. e. boron trichloride, boron fluoride and the like. Such derivatives of rubber and their modes of preparation are described in U. S. Patents Nos. 1,797,118, 1,846,247, 1,853,334 and 2,230,359. It is to be understood that it is such compounds that are embraced by the term "cyclicized rubber derivative," subsequently appearing herein and in the claims. Such derivatives of rubber are commercially exploited by the Goodyear Tire & Rubber Co. under the trade name "Pliolite" and the products offered by this company for sale under this trade term have been found by me to be satisfactory for the present purpose. It may be added that the products sold under this trade name vary in character from a balata-like substance to an exceedingly hard material, depending upon the duration of the condensation reaction, the reactants and the proportions thereof employed.

I have found that I can use the resins of the following softening points interchangeably, the only difference being in the viscosity of the final composition when subjected to heat:

| | Degrees centigrade |
|---|---|
| "Pliolite P-704" | 45 |
| "Pliolite Resin" | 55 |
| "Pliolite Resin #40" | 75 |
| "Pliolite Resin #20" | 105 |

The purpose of the "Pliolite" resins is to harden and toughen the polyisobutylene. However, while effecting this function to a very satisfactory extent the cyclicized rubber derivative introduces a problem with regard to compatibility of the components. Thus polyisobutylene is not very compatible with the cyclicized rubber derivative. This undesirable feature I have found is very nicely overcome by resort to the aforementioned terpene polymer resins. Such resins are commercially marketed under the trade names of "Nypene" and "Piccolyte." "Nypene" is described in the sales literature as a terpene polymer resin originating from turpentine. It differs from rosin in that it has a strictly hydrocarbon structure. The hydrogen-carbon ratio is approximately the same as in natural rubber. Resins of this type are made by polymerizing beta-pinene or other terpenes which are derived from turpentine and whose empirical formula is $C_{10}H_{16}$. These resins can be manufactured with a wide variety of physical properties by controlling the degree of polymerization. The low polymers are liquids and as the degree of polymerization is increased, the liquids are converted first into viscous, tacky substances resembling balsam, and, eventually, into resinous solids which can be made, by suitable control of the polymerization, to have melting points from 10° C. to 150° C. and probably higher.

"Piccolyte" resin is described in the sales literature as being a pure hydrocarbon thermoplastic terpene resin which is composed essentially of polymers of selected terpadienes.

For my purpose the "Nypene" and "Piccolyte" resins can be used interchangeably and for my purpose they function as if they were identical.

All the terpene resins mentioned possess some degree of unsaturation and, therefore, they are capable of being hydrogenated, as described, for instance, in U. S. Patent 2,249,112. The hydrogenated resins are also very useful as elements of my compositions, inasmuch as they are particularly compatible with the other components of my compositions.

The important effect wrought by the terpene polymers in question and their hydrogenated derivatives in making all of the components compatible is not clearly understood nor are the reasons ascertainable why these terpene polymers produce this result. I have found, however, that the particular homogenizing action, which exceeds that of other resins to a very marked degree, is possessed by all of the polymer resins of terpenes originating from turpentine with which I have experimented, and it is my theory that the result is attributable to the terpene structure of such resins or polymers. It is to be understood, however, that this is merely a theory, the important fact being that the polymers or resins in question do have a very effective homogenizing action on the other components of the compositions including the waxes.

Various types of waxes may be incorporated as the wax component. Thus I have discovered that amorphous waxes, natural waxes, mineral waxes and the like are satisfactory. The mineral waxes give the best results and for my purposes I prefer the use of paraffin wax. Several of the waxes may be added, if desired.

The proportions of the ingredients which may be used may vary over a considerable range. Satisfactory results have been achieved with the following proportions of ingredients:

|  | Percent by weight |
| --- | --- |
| Polymer | 5 to 25 |
| Wax | 30 to 60 |
| Cyclicized rubber derivative | 5 to 20 |
| Terpene polymer | 10 to 50 |

The properties of the resulting compositions may also be varied by the inclusion of additional resins of the natural or synthetic type. Of the natural resins mention may be made of dammar, rosin and its esters. Among the synthetic resins those of the cumar type have been found to be very useful adjuncts. It is also possible to include in the compositions pigments, fillers or coloring materials during the milling or mixing procedure.

The invention is further illustrated by the following examples, wherein the parts are by weight. It is to be understood that these examples are illustrative only and not limitative.

Example I 22 parts of "Pliolite" having a softening point of 55° C. is intimately mixed at a temperature of 125° C. with 28 parts of polyisobutylene (having a molecular weight of 95,000) on a rubber mill or in a kneading machine. The temperature of the mill is then lowered to 30° C. and 50 parts of paraffin wax having a melting point of 60° C. are thoroughly mixed in. 100 parts of this mixture are then melted into 40 parts of a polymerized terpene resin of the type specified which has previously been melted and kept at 170° C. This gives a highly viscous melt which can easily be spread onto cloth, metal foils, paper, etc. to give a film which is moisture-proof, dry feeling and which retains its thermoplasticity.

Example II 15 parts of polyisobutylene of 75,000 molecular weight is milled with 35 parts of paraffin wax having a melting point of 60° C. 50 parts of this mix is then added to 50 parts of a melted mixture (maintained at a temperature of 150° C.) of "Pliolite" and "Piccolyte S-100" which has previously been prepared by intimately mixing at 150° C. in a kneading machine and consists of 37.5 parts of "Pliolite" having a softening point of 105° C. and 125 parts of "Piccolyte S-100" which is a resin that is made by polymerizing beta-pinene. This can be applied as in Example I, the resulting melt being much lower in viscosity.

As stated, the new compositions may be employed for any of the purposes for which gutta percha is used. As pointed out in Example I, they may be applied as coatings on cloth, paper and the like to render the same moisture-proof. They may be so applied either in melt form or after dissolution in a suitable solvent, such as benzol. Compositions may also be rolled to produce self-sustaining sheets and foils and these in turn can be employed in lamination and adhesive work as heat-sealing adhesives. It is also possible to adjust the melting point of the compositions to not higher than 100° C., as a result of which they may be emulsified in the manner usually employed for this purpose, such as in a high-speed stirring apparatus by means of an emulsifying agent comprising the soap of a higher fatty acid, for example, sodium or triethanol amine stearate.

Various modifications of the invention will occur to those skilled in the art and accordingly I do not intend to be limited in the patent granted, except as required by the prior art and the appended claims.

I claim:

1. Compositions similar to natural gutta percha but resistant to oxidation, comprising 5 to 25% by weight of a substantially saturated linear polyiso-olefine having a molecular weight in excess of 1500, 5 to 20% of a cyclicized derivative of rubber, 30 to 60% by weight of a wax, and as a homogenizing agent, 10 to 50% of a resin selected from the group consisting of the polymers of the terpenes originating from turpentine and the hydrogenated derivatives of these polymers.

2. Compositions, as claimed in claim 1, wherein the polyiso-olefine is a polyisobutylene having a molecular weight in excess of 5000.

3. Compositions, as claimed in claim 1, wherein the wax is a mineral wax.

4. Compositions, as claimed in claim 1, wherein the wax is paraffin wax.

5. Compositions, as claimed in claim 1, wherein the homogenizing resin is polymerized beta pinene.

6. A composition similar to natural gutta percha but resistant to oxidation comprising 22 parts by weight of a cyclicized rubber having a softening point of 55° C., 28 parts by weight of polyisobutylene having a molecular weight of 95,000, 50 parts by weight of a paraffin wax having a melting point of 60° C. and 40 parts by weight of a resin obtained by polymerization of a terpene originating from turpentine.

7. A composition similar to natural gutta percha but resistant to oxidation comprising 15 parts by weight of polyisobutylene having a molecular weight of 75,000, 35 parts by weight of a paraffin wax having a melting point of 60° C., 11.5 parts by weight of a cyclicized rubber having a softening point of 105° C., and 38.5 parts by weight of a resin obtained by polymerization of beta-pinene.

GERRY P. MACK.